United States Patent [19]

Münte

[11] 4,426,288

[45] Jan. 17, 1984

[54] METHOD AND APPARATUS FOR CONVEYING AND DAMMING BACK LIGHTER LIQUIDS FLOATING ON SPECIFICALLY HEAVIER LIQUIDS, PARTICULARLY OIL FLOATING ON WATER

[75] Inventor: Harm-Hinrich Münte, Reinbek-Neuschönningstedt, Fed. Rep. of Germany

[73] Assignee: Jastram-Werke GmbH & Co. KG., Hamburg, Fed. Rep. of Germany

[21] Appl. No.: 325,824

[22] Filed: Nov. 30, 1981

[30] Foreign Application Priority Data

Dec. 9, 1980 [DE] Fed. Rep. of Germany ... 8032677[U]
Oct. 13, 1981 [DE] Fed. Rep. of Germany ... 8129821[U]

[51] Int. Cl.$^3$ ............................................. E02B 15/04
[52] U.S. Cl. ................................... 210/242.3; 210/923
[58] Field of Search ............... 210/634, 776, 801, 923, 210/DIG. 5, 242.3

[56] References Cited

U.S. PATENT DOCUMENTS 3,715,034 2/1973 Ivanoff ............................. 210/923 X
3,847,815 11/1974 Chastan-Bagnis ............. 210/776 X
4,006,086 2/1977 Tsunoi ............................. 210/776 X

FOREIGN PATENT DOCUMENTS 7113498 4/1972 Netherlands ........................ 210/923

Primary Examiner—Frank A. Spear, Jr.
Attorney, Agent, or Firm—Toren, McGeady and Stanger

[57] ABSTRACT

According to the present method a local overspeed is produced in the vicinity of the interface between the two liquids by means of a special apparatus, either actively by a moving component or passively by the relative incident flow. As a result of this overspeed the lighter liquid is conveyed in the desired direction and is optionally dammed back in front of a retaining wall.

12 Claims, 3 Drawing Figures

METHOD AND APPARATUS FOR CONVEYING AND DAMMING BACK LIGHTER LIQUIDS FLOATING ON SPECIFICALLY HEAVIER LIQUIDS, PARTICULARLY OIL FLOATING ON WATER

BACKGROUND OF THE INVENTION

The invention relates to a method and to an apparatus for conveying and damming back specifically lighter liquids floating on specifically heavier liquids and in particular oil which has spread over a water surface.

As a result of tanker accidents caused by collisions or grounding, as well as offshore accidents, large quantities of oil are constantly being discharged and spread rapidly over the surface of the water. As a function of the oil type and the weather conditions this leads to large-area oil films or relatively thick carpets of oil, which are then dispersed by the wind and currents The oil must be removed as rapidly as possible to protect both the sea and the coastal areas from such pollution. For this purpose it is necessary to draw off the oil layers from these areas and convey them to points where they can be more easily skimmed off with conventional equipment. However, effective skimming off is only possible if the oil layer is greatly thickened or is dammed back.

This conveying and damming back of the oil often constitutes a serious practical problem, because in front of all wall-like structures moved through oil-covered water a vortex roller in the form of the so-called "oil film back-vortex" is formed. This not only prevents the damming back of the oil, but also forms vortex trains carrying down into the depths the broken up oil layer.

BRIEF SUMMARY OF THE INVENTION

The problem of the present invention is to provide a method and apparatus eliminating the problems occurring during the conveying and damming back of oil and which permit a contactless conveying and damming back of the oil in front of wall-like components, so as to permit a rational and complete skimming off of oil floating on water.

According to the invention this problem is solved by a method for conveying and damming back lighter liquids floating on specifically heavier liquids, particularly oil floating on water, wherein a local overspeed directed in the desired conveying direction can be produced by a passively or actively operating apparatus in the vicinity of the interface of the two liquids.

The invention also proposes an apparatus for performing this method wherein in the case of incident flow, caused both by the characteristic motion of the apparatus and by the natural movement of the liquid, the apparatus comprises an approximately vertical wall arranged approximately at right angles to the incident flow direction and has a planar, profiled, or some other shape which is favourable from the flow standpoint and whose upper edge is located in the vicinity of the interface of the two liquids.

Thus, the essence of the invention is to produce a local overspeed in the vicinity of the oil/water interface. By means of a separate apparatus a local overspeed is produced in the vicinity of the interface between the two liquids either actively, e.g. by a moving component, or passively e.g. by the relative incident flow and this conveys the lighter liquid in the desired direction and optionally dams it back in front of a retaining wall.

This eliminates the cause of the so-called oil film back-vortex, namely the speed gradient in the oil/water interface which forms when attempting to dam back in front of a wall and in addition an overspeed of the oil layer compared with the underlying water is obtained. Only as a result of this is it possible to dam back the oil layer to a considerable thickness in front of a wall.

For the purpose of producing this overspeed according to further embodiments of the invention actively functioning apparatuses, e.g. rotors or impellers are proposed, which build up a flow in the conveying direction on their top surface. It is also possible to use passively operating apparatuses, e.g. vertical walls, weirs, or displacers, against which there is a flow either due to the movement of the apparatus or through the natural flow movement of the water. This flow is stopped in front of the wall and divided up, one part flowing with a high overspeed over the upper edge of the apparatus, whilst the remainder flows out round the bottom.

The quality of the conveying and damming back of the oil in the case of these apparatuses is dependent on the size of the apparatus, the position of the oil/water interface and the hydrodynamic shape.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
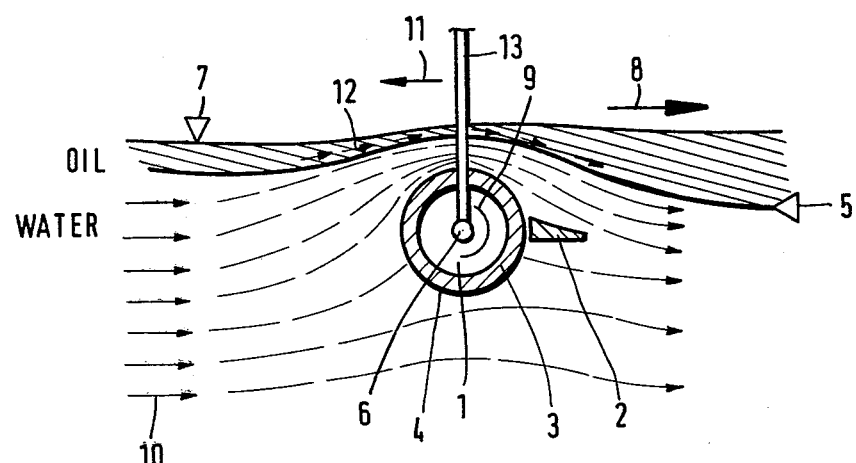
FIG. 1 a front view of a rotor with a stripping edge.

An apparatus for performing the method according to the invention comprises, according to the embodiment of FIG. 1, a rotor 1, which is substantially constructed in roller-like manner, with a stripping edge 2 arranged on the back thereof. The casing 3 of rotor 1 is made from a random material and provided with a random surface structure 4. The upper edge of the rotor is positioned somewhat below the oil/water interface 5, its pivot pin 6 being approximately parallel to the liquid surface 7 and approximately perpendicular to the conveying direction 8. The rotation direction 9 of rotor 1 is selected in such a way that the circumferential speed at the top, which faces the oil, is directed in the conveying direction. This circumferential speed should be higher than the relative movement between the water and the rotor caused by the incident flow 10 or the characteristic motion 11. As a result in the area between the rotor and the oil layer the water is accelerated to such an extent that a local overspeed is formed. This is able to transfer the shear or thrust forces 12 to the oil layer, so that the oil moves in the rotation direction 9 of the rotor and thickens to form a compact layer.

The stripping or contact edge 2, which can also be fitted at some other point and have some other shape, is intended to prevent the entraining of oil particles, whilst ensuring a uniform flow. Rotor 1 can be driven by an external or integrated motor of random design, it being possible to utilize mounting support 13 for the energy supply.

Figure 2:
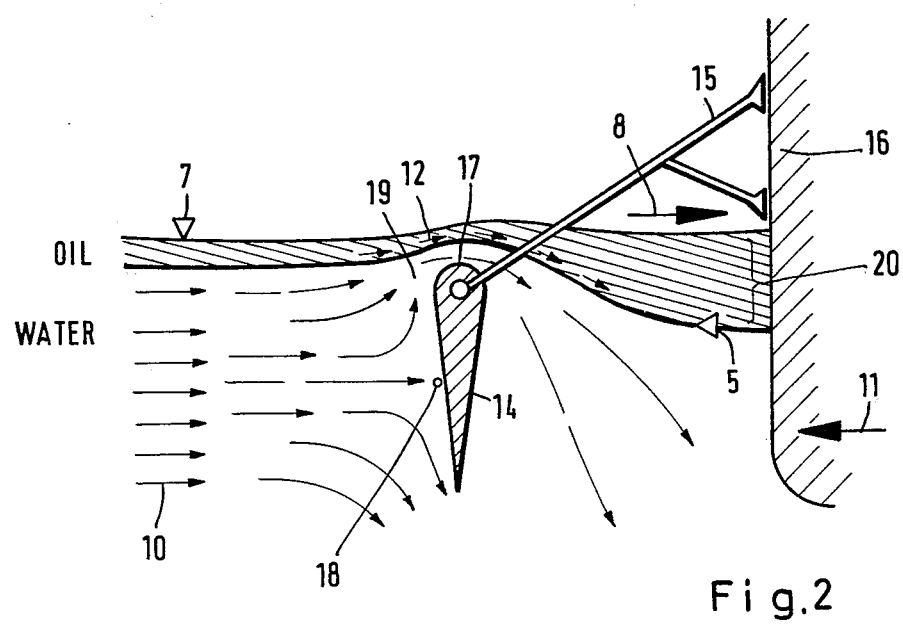
FIG. 2 a front view of a profiled weir with a rigid mounting support in front of a retaining wall.

FIG. 2 shows a passively functioning weir 14, which for flow reasons is given a profile-like shape in the present case. It is fixed with a rigid mounting support 15 to a retaining wall 16 in such a way that its upper edge 17 is positioned just below the oil/water interface 5. The water movement 10 in front of weir 14, brought about either by the characteristic motion 11 of the complete installation or by the natural incident flow of the water, forms a potential flow at the front of weir 14 with a stagnation point 18. Part of the water flows below the weir and the remainder 19 flows at high speed over the upper edge 17 and thereby entrains the oil in the desired conveying direction 8. The oil is then dammed back to form a thick layer 20 in front of retaining wall 16, which can e.g. form part of a hull. It can then be removed much more easily than the thin oil film in front of the apparatus. Weir 14 is held in the semi-submerged position by the rigid or movable mounting support 15, which is fixed to the fixed or floating wall 16.

Figure 3:
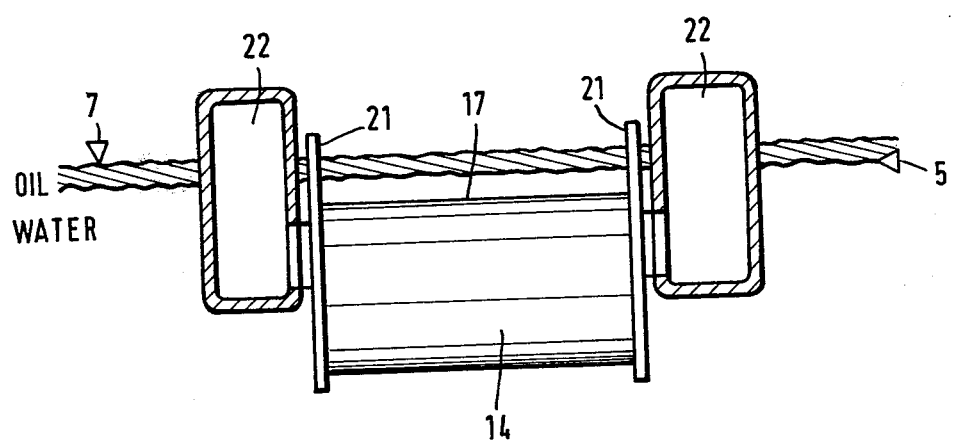
FIG. 3 a longitudinal section through a weir with pontoons and end plates.

FIG. 3 shows the longitudinal section through a weir 14 in the direction of the incident flow. To avoid lateral flow-round, at the end faces of the apparatus end plates 21 are provided, which project above the surface of the liquid. In addition, the pontoons 22 are shown in exemplified manner and they maintain the weir in its semi-submerged position. They enable the apparatus to convey and dam back the oil, even in moving water.

For directing and conveying larger, closed carpets of oil it is possible to use a plurality of identical or different apparatuses of the aforementioned types, which can be juxtaposed, arranged in succession or positioned at random angles to one another. They are interconnected by mounting supports or vertical walls, which simultaneously serve to guide the oil, or by horizontal bottoms, which are advantageously provided with holes to permit the outflow of the water.

What is claimed is:

1. An apparatus for conveying and damming back a layer of lighter liquid floating on a body of a specifically heavier liquid such as a layer of oil floating on a body of water, with the body of the heavier liquid forming an interface with the layer of the lighter liquid, comprising means positionable within the body of heavier liquid adjacent the interface between the lighter and heavier liquids for affecting an overspeed of the combined liquids flowing between said means and the surface of the lighter liquid relative to the normal flow speed of the combined liquids for transferring shear or thrust forces into the layer of lighter liquid, and said means including an upper surface adjacent to and spaced closely below the interface of the liquids for lifting and compacting the heavier liquid flowing over said upper surface so that downstream of said upper surface the heavier liquid has a downward component of flow whereby above said upper surface the layer of lighter liquid is compacted and downstream of said upper surface the layer of lighter liquid thickens for affording removal of the lighter liquid, said means comprises a weir-like member with a pair of approximately vertically extending surfaces each extending generally perpendicularly of the direction of the normal flow with one said vertically extending surface facing upstream and the other said vertically extending surface facing downstream relative to the normal flow direction with said upper surface located at the upper ends of and interconnecting said vertically extending surfaces.

2. An apparatus, as set forth in claim 1, wherein an end plate is located at each of the opposite ends of said vertically extending surfaces with said end plates extending transversely of the ends of said vertically extending surfaces and projecting upwardly from said upper surface above the surface of the lighter liquid.

3. An apparatus, as set forth in claim 1, wherein a special component is located adjacent the downstream side of said member below said upper surface thereof for assisting in the removal of the lighter liquid.

4. An apparatus, as set forth in claim 1, including a fixed support wall spaced downstream from said member, and mounting means connected to said wall and to said member for supporting said member in spaced relation to said wall.

5. An apparatus, as set forth in claim 1, including at least one buoyant pontoon supporting said member in a submerged position.

6. An apparatus, as set forth in claim 1, including an approximately vertical retaining wall spaced downstream from said member, a rigid support attached to said retaining wall, and extending outwardly therefrom and said member fixed to said support at a position spaced from said retaining wall.

7. An apparatus for conveying and damming back a layer of lighter liquid floating on a body of a specifically heavier liquid such as a layer of oil floating on a body of water, with the body of the heavier liquid forming an interface with the layer of the lighter liquid, comprising means positionable within the body of heavier liquid and adjacent the interface between the lighter and heavier liquids for effecting an overspeed of the combined liquids flowing between said means and the surface of the lighter liquid relative to the normal flow speed of the combined liquids for transferring shear or thrust forces into the layer of lighter liquid, and said means including an upper surface adjacent to and spaced closely below the interface of the liquids for lifting and compacting the heavier liquid flowing over said upper surface so that downstream of said upper surface the heavier liquid has a downward component of flow whereby above said upper surface the layer of lighter liquid is compacted and downstream of said upper surface the layer of lighter liquid thickens for affording removal of the lighter liquid, said means comprises a cylindrically shaped rotor casing with the axis thereof extending generally horizontally and perpendicularly to the normal flow direction of the combined liquid, said upper surface formed by the upper surface of said rotor casing, and a support for said rotor casing for locating said upper surface thereof below the interface of the lighter liquid and heavier liquid.

8. An apparatus, as set forth in claim 7, wherein said rotor casing is formed of a rigid material.

9. An apparatus, as set forth in claim 8, wherein the outside surface of said rotor casing is smooth.

10. An apparatus, as set forth in claim 7, wherein said rotor casing is formed of a flexible material.

11. An apparatus, as set forth in claim 10, wherein the surface of said rotor casing is smooth.

12. An apparatus, as set forth in claim 7, wherein a stripping edge is located on the downstream side of said rotor casing approximately at the level of the axis of said rotor casing for preventing the entraining of particles of the lighter liquid in the heavier liquid.

* * * * *